April 12, 1966   T. H. BENZINGER ETAL   3,245,758
CALORIMETRY FOR PHOTOCHEMICAL REACTIONS
Filed Sept. 30, 1963

INVENTORS
Theodor H. Benzinger
Lutz Kiesow
BY
Attorney

United States Patent Office 3,245,758
Patented Apr. 12, 1966

3,245,758
CALORIMETRY FOR PHOTOCHEMICAL REACTIONS
Theodor H. Benzinger, 8730 Preston Place, Chevy Chase, Md., and Lutz Kiesow, No. 3 Pooks Hill Road, Bethesda, Md.
Filed Sept. 30, 1963, Ser. No. 312,797
19 Claims. (Cl. 23—230)

The invention disclosed herein may be manufactured and used by or for the Government of the United States of America for governmental purposes without the payment of any royalties thereon or therefor.

The present invention relates generally to procedures for studying photochemical reactions and, more particularly, to calorimetric apparatus for investigating the kinetics and thermodynamics of such reactions.

Calorimeters currently available for investigating photochemical reactions, such as photosynthetic cycles, have certain features which impair their precision and complicate their operation. For example, dissimilar types of instruments are employed in these devices for measuring the heat contribution from the activating light source and the heat given off by the reaction. With different types of detecting instruments, both the calibration and data interpretation operations are difficult.

The light source employed in these calorimeters also directly influences to an unknown extent the measurement of the heat exchanged by the photochemical reaction. Moreover, since this light is introduced from the outside into the reaction system, this system, perforce, cannot be completely enclosed and therefore fully protected against external thermal disturbances.

It is accordingly a primary object of the present invention to provide a new and novel method for studying the kinetics and thermodynamics of photochemical reactions.

Another object of the present invention is to provide a method for studying photochemical reactions calorimetrically wherein a chemiluminescent process serves as the activating light source for the reaction.

Another object of the present invention is to provide a calorimeter for use in investigating the thermal characteristics of photochemical reaction wherein a chemical light source is accommodated within the core of the instrument.

A still further object of the present invention is to provide a calorimeter for photochemical reactions wherein the amount of heat introduced into the system by the light source can be readily ascertained.

A yet still further object of the present invention is to provide an arrangement for illuminating photochemical reactions with an efficient and reproducible light source.

A yet still further object of the present invention is to provide a reaction vessel for photochemical reactions wherein the light source and the photochemical materials are disposed in concentric annular spaces for efficient illumination purposes.

Other objects, advantages and novel features of the invention will become apparent from the following detailed description of the invention when considered in conjunction with the accompanying drawings wherein.

Figure 1:
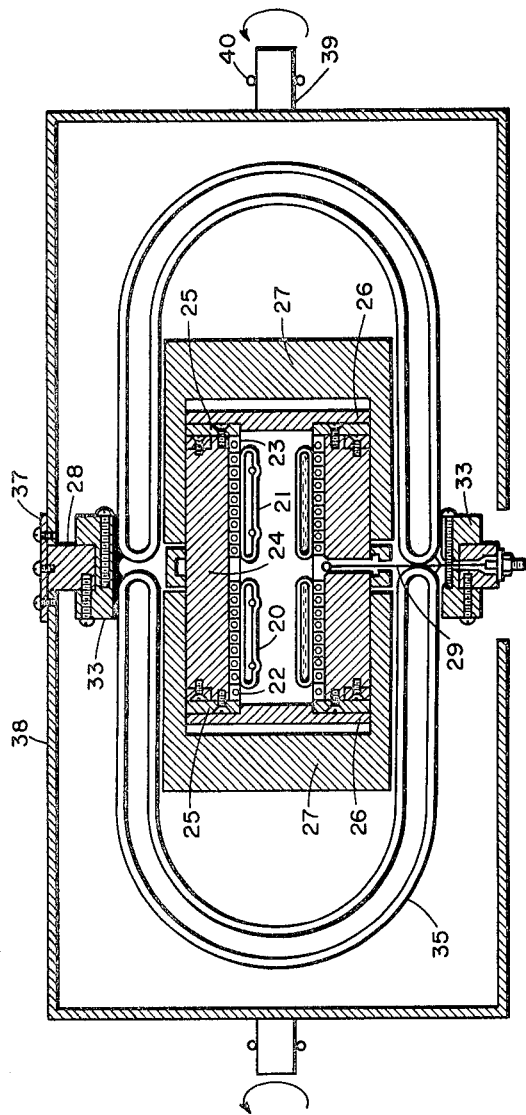
FIG. 1 illustrates a microburst calorimeter used in practicing the present invention.

In copending application, Serial No. 17,232, filed March 23, 1960, in the name of Theodore H. Benzinger, a co-applicant, there is disclosed a new Heatburst Microcalorimeter whose improved response time and increased sensitivity make it possible for the first time to investigate quantitatively low level heat-producing chemical and biochemical reactions. In this new instrument, double-walled reaction and blank vessels of identical construction are disposed in an end-to-end relationship within the core of a sleeve. The complete outer wall surface of this sleeve is blanketed with the hot junctions of a pair of so-called "area thermopiles" of coiled, helical design, and the complementary cold junctions of these thermopiles completely blanket the inner surface of a concentric hollow heat sink.

In this instrument, the bulk solution is accommodated in an annular space defined by a pair of concentric tubular members. This arrangement widely disperses this solution, forming it into a thin film, and thus maximizes its heat transfer surface area.

Because of the unique relationship and coaction between this heat transfer surface, the area thermopiles and the heat sink, the heat of reaction is immediately discharged into the heat sink as a heat pulse and the rapid passage of this pulse through the thermopiles imparts to the output voltage signal a similar pulse configuration. The area thermopiles thus function as low thermal impedance heat transfer means and highly efficient electrical signal generating devices. As a consequence of this mode of operation, which for the first time fully exploits the thermal potential difference between the reaction and the heat sink, the microcalorimeter of the above application possesses an extremely high sensitivity to instantaneous reactions, an improved speed of response to changing rates of heat flow and a reduced error from inertial distortions and external temperature disturbances.

Moreover, the need for mechanical mixing and stirring devices, sources of unknown error in the prior art equipment, is eliminated in the heatburst microcalorimeter of the above application. Instead, only gravitational forces are employed to carry out these operations. Because of the enhanced power of resolution of this instrument, even the relatively small amounts of heat introduced by this method of mixing can be accurately ascertained by simply repeating the original mixing motions after thermal equilibrium has been established and recording the voltage wave form so generated.

In the above microburst microcalorimeter, the reaction and blank vessels are thermally isolated from the surrounding environment, first, by a heat sink, then, by metallic caps and Dewar vessels and, finally, by an outer cover. The first two of these structures also provide a light type environment for these vessels.

The present invention extends the use of the heatburst microcalorimeter to the field of photochemical reactions by utilizing as the activating light source an internal chemiluminescent reaction which can be instituted at the start of the measuring operation. The various substances which are involved in this light-producing chemical reaction are accommodated within the reaction and blank vessels, but they are physically isolated from the photochemical reaction materials and from each other until the microburst calorimeter is subjected, for example, to rotary motion about its longitudinal axis. More particularly, the light-producing chemical materials are constrained in an annular space which is concentric with that in which the photochemical materials are accommodated. This geometry insures an efficient and complete illumination of the reaction by the chemical light source.

The reaction vessel is constructed so that all of the light developed by its chemical source passes into the photochemical reaction. The blank vessel is constructed so that none of the light produced by its chemical reaction reaches the photochemical material. Because of this last feature, all of the chemical light in the blank vessel is converted into heat and the surrounding thermopile develops a voltage signal indicative of the energy introduced into the system by the light source. It will be appreciated that by the same token the thermopile surrounding the reaction vessel develops a voltage indicative of the heat evolved by the photochemical reaction. However, this output also includes a component due to the unabsorbed light that is transmitted through the photochemical materials. To arrive at the net heat generated by the photochemical reaction alone, the voltage produced by the thermopile surrounding the blank vessel must be subtracted from the last-mentioned voltage.

It is important to note that under certain circumstances all of the light generated by the chemiluminescent process is not absorbed by the photochemical reaction and that a portion thereof passes therethrough and illuminates the shell of the calorimeter. This light, however, is not lost in the measuring operation since it is converted to heat and detected by the encompassing thermopile. Consequently, all of the energy contributed by the chemical light source is accounted for.

Referring now to FIG. 1 of the drawings, which corresponds in all important details to FIG. 5 of the above copending application, the heatburst microcalorimeter in its twin calorimeter configuration is seen to comprise a double-wall reaction vessel 20 and an identical blank vessel 21 disposed in an end-to-end relationship within the core of a cylindrical, heat-conducting sleeve whose outer surface is completely blanketed by the hot junctions of a pair of "area thermopiles" 22 and 23. Each of these so-called "area thermopiles" is fabricated by first winding a constantan conductor in a helix, then copperplating half of each individual turn thereof to form thermojunctions at diametrically opposite points and thereafter coiling the plated, helical structure about the outer surface of the cylindrical sleeve. Surrounding both area thermopiles is a cylindrical heat sink 24 whose inner surface is completely blanketed with the cold junctions of these thermopiles. This heat sink is closed off by metal covers 26 and also by heavy, metallic caps 27, the latter serving to increase the heat capacity of the system and provide a thermal short circuit between the various arcuated sectors forming the heat sink. Heat sink 24, end covers 26 and caps 27, it would be pointed out, combine to make the central core of the microburst calorimeter where the reaction and the blank vessels are disposed, light-tight. Also contributing to this condition is the presence of the instrument's outer enclosure 38.

The temperature responsive elements of the apparatus are further thermally isolated from the local environment by a pair of confronting, U-shaped Dewar vessels 35. Moreover, the heat sink is held in radial suspension by several wires 29 which are fastened to it and an outer ring 28, an arrangement which further restricts heat inroads into the temperature-sensitive portion of the instrument. This assembly is also enclosed by a container 38, and the space between it and the Dewar vessels is filled with an insulating material, such as Styrofoam, for additional thermal protection. The instrument may be rotated about its longitudinal axis by means of stub shafts 39 or tilted for mixing and other allied purposes, such as preventing sedimentation of suspended particles.

Figure 3:
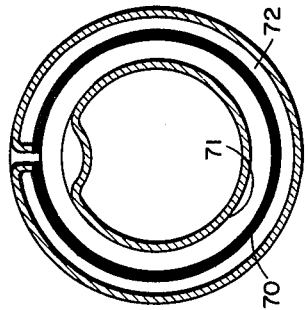
FIG. 3 is a cross-sectional view of a blank vessel showing the opaque barrier isolating the photochemical reaction from the reaction under observation.
Figure 2:
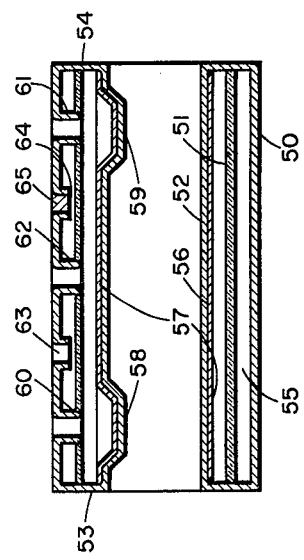
FIG. 2 shows the details of a reaction vessel used in the calorimeter of FIG. 1.

When photochemical reactions are being investigated with this microburst calorimeter, reaction and blank vessels of the type shown in FIGS. 2 and 3 are inserted individually or in combination into the central core of the apparatus. Referring now to FIG. 2, which illustrates a reaction vessel constructed according to one embodiment of the invention, it will be observed that the vessel is of triple-wall construction having an outer cylindrical wall 50, an intermediate wall 51 and an inner wall 52. The tubular members serving as these walls preferably should be made of a material that has good heat-conducting properties. However, intermediate wall 51 must be made of a translucent substance. By interconnecting the rim portions of these tubular elements with suitable end walls 53 and 54, two concentric, annular shaped storage compartments 55 and 56 are formed.

The inner one of these compartments accommodates the materials involved in the chemiluminescent reaction; the outer, the photochemical reaction materials. In order to insure that all of the light generated in inner compartment 56 reaches the photo reaction, the outer surface of wall 52 is made light reflecting by, for example, the application thereto of a suitable metallic coating 57. The same effect can also be realized, it will be appreciated, by applying this coating or a reflecting foil to the inner surface of this wall.

To provide a temporary accommodation for one of the two substances involved in the chemiluminescent reaction, a pair of dimpled recesses 58 and 59 are formed in wall 52. In line with each of these recesses and providing access thereto are a pair of capillaries 60 and 61 which pass through walls 50 and 51. A third capillary 62 also passes through these walls at a point intermediate the dimpled recesses for introducing the other substance into the main body of the inner compartment.

Outer wall 50 is pierced at two spaced points, such as 63 and 64, and these apertures provide a means for introducing the materials involved in the photochemical reaction into outer compartment 55. After the filling operations are completed, each of the various access openings may be sealed off by any suitable closure device, such as the tapered plug 65, whose head fits flush with the outer surface of wall 50 to give an uninterrupted cylindrical shape to the complete vessel.

The blank vessel, a cross-sectional view of which is depicted in FIG. 3, is similar to the reaction vessel except for one important detail, namely, its intermediate wall 70 is opaque rather than transparent to the light emitted by the chemical reaction. Hence, this wall acts as a light barrier to prevent the transmission of light from the chemiluminescent material in compartment 71 to the photo reaction material in compartment 72. Because of this feature, the photo reaction never takes place in the blank vessel and all of the light accompanying the chemiluminescent process is converted into heat energy.

The procedure for operating the microburst calorimeter is as follows: First, known amounts of the two substances which are involved in the chemiluminescent reaction, which may be, for example, luciferase and adenosinetriphosphate, are placed in inner compartment 56 of the reaction vessel via the capillaries above mentioned. One of these substances is deposited in the two dimpled recesses, while the other, the one of larger bulk or of higher viscosity, is inserted into the main body of this compartment. Next, a known amount of the photochemical reaction materials are placed in the outer compartment 55. During these preliminary loading operations, the reaction vessel, of course, is held in a horizontal attitude. After filling, all of the various apertures are sealed. Next, the reaction vessel is carefully inserted into the central core of the microburst calorimeter and positioned in the location occupied by either vessel 20 or 21 in FIG. 1. With the reaction vessel so positioned, the heat evolved therefrom will be measured by one of the two area thermopiles included in the calorimeter.

Because the microburst calorimeter above described is designed for operation in the twin calorimeter mode, there must be two vessels having the same fluid content in the central core during control runs or during analytical experiments. The second vessel is required for thermal reasons. Without this companion vessel, the system would be thermally unbalanced with a one-sided heat flow into and out of the fluid-filled vessel uncompensated by a similar heat flow through the twin thermopile. With no heat capacity adjacent to this twin thermopile, the system would, at best, give erratic results. Consequently, after the reaction vessel is inserted, a second vessel of general similar construction but having its compartments occupied with water is positioned in the core opposite the other area thermopile.

After thermal equilibrium has been attained, a condition which can be readily ascertained by examining the output voltage of the area thermopile, the complete apparatus is rotated about its horizontal axis and/or tilted in accordance with a pre-established schedule, such as the one set forth in the above copending application. This motion results in the mixing and stirring of the two materials within inner compartment 56 and the institution of the chemiluminescent reaction. The attendant radiation, of course, immediately triggers the photochemical reaction, and the thermal evolution of this reaction shows up in the amplitude and wave form of the voltage signal produced by the thermopile recorder.

After the photochemical reaction has run its course and thermal equilibrium reached, the heat introduced into the system by the mixing and stirring motions may be measured by simply repeating these motions and recording the output wave form. This last measurement preferably should be repeated until a reproducible wave form appears on the recording instrument.

The output voltage of the area thermopile above obtained represents both the heat absorbed and generated by the photochemical reaction and that produced by the transmitted light which reaches the calorimeter's sleeve and is converted into heat. Thus, all of the heat present in the system is accounted for.

It would be pointed out that the reaction vessel construction of FIG. 2 provides an optimal geometry for the illumination of the photoreaction materials and that the total rather than a fraction of the energy emitted is conferred upon this system. Because of the internal location of the light source, the thermal sensitive elements can be completely protected from external heat disturbances. Moreover, and of great importance, is the fact that the chemical light reaction makes available an accurate and reproducible amount of light, both the time duration and intensity of which can be selected in accordance with the reaction requirements.

In control experiments, a blank vessel of the type shown in FIG. 3 is employed. Since, as mentioned hereinbefore, the photochemical reaction is isolated from the chemiluminescent process because of the opaque intermediate wall of the vessel, all of the light excited in this process is converted into heat.

The preliminary filling operations enumerated above are repeated in the control experiments and, thereafter, the blank vessel is inserted into the central core of the microburst calorimeter. Its position in this core should be such that it cooperates with one of the two area thermopiles. Also inserted into the central core for the reasons mentioned above is a similar blank vessel having its compartments filled with water or any other suitable liquid. After thermal equilibrium is reached, the complete apparatus is subjected to the rotational and tilting movements chosen to carry out the mixing and stirring operations. Thereafter, the experiment continues along the lines described above in connection with the reaction vessel.

In order to arrive at the heat evolved by the photochemical reaction alone, it is, of course, necessary that the heat observed in the control experiment be subtracted from the heat recorded in the test experiment.

A check of the amount of heat contributed by the chemical light source can also be made with the reaction vessel by "poisoning" the photochemical reaction. Thus, even though illuminated, this reaction would not proceed.

In the above description, the reaction and blank vessels were inserted in the calorimeter core one after the other with separate recordings made of the evolved heat. However, the investigation can be carried out with both vessels within the core at the same time and in an end-to-end relationship, as shown in FIG. 1. To prevent light leakage from the reaction vessel to the blank vessel, a suitable light barrier, such as an opaque plug, can be disposed between these vessels. When the investigation is carried out in this twin calorimeter mode, the output voltage recorded represents the net heat of reaction because of the electrical series opposition connection of the two area thermopiles.

It would be mentioned that instead of utilizing recesses in the wall surface of the vessel to keep the two substances involved in the chemiluminescent process apart prior to the mixing motions, any of the various accessories and vessel constructions shown in the above copending application can be utilized. Also, instead of one compartmented vessel, two separate, telescoping vessels may be employed.

In the above description the photochemical reaction was instituted by a chemiluminescent process for the reasons mentioned. However, it should be understood that, if desired, conventional light sources can be disposed within the open core of the reaction and/or blank vessels for accomplishing this same function. With such light sources of course, the vessels need only have a single annular compartment with only the inner boundary wall surface of the blank vessel opaque to prevent the reaction of the photochemical reactants accommodated therein. The electric power for energizing these sources can be derived, for example, from miniature batteries positioned within either the core or the heat sink or from an external source via suitable conductors, with appropriate switching devices also included for controlling the start of the photochemical reaction.

Obviously many modifications and variations of the present invention are possible in the light of the above teachings. It is therefore to be understood that within the scope of the appended claims the invention may be practiced otherwise than as specifically described.

What is claimed is:

1. In a calorimetric method for determining the thermal response of a photochemical reaction, the steps of
    producing a chemiluminescent reaction with known amounts of participating substances;
    illuminating the photochemical reaction with the light radiated by said chemiluminescent reaction, thereby to institute said photochemical reaction;
    and measuring the amount of heat produced by said photochemical reaction by thermopile means.

2. In a calorimetric method for determining the thermal response of a photochemical reaction, the steps of
    producing a chemiluminescent reaction with known amounts of participating substances;
    illuminating the photochemical reaction with the light radiated by said chemiluminescent reaction thereby to institute said photochemical reaction;
    measuring the total heat generated by said chemiluminescent reaction and said photochemical reaction;
    and thereafter ascertaining the heat generated by said chemiluminescent reaction.

3. In a calorimetric method for determining the thermal response of a photochemical reaction, the steps of
    producing a first chemiluminescent reaction with known amounts of predetermined participating substances;
    illuminating the photochemical reaction with the light radiated by said chemiluminescent reaction thereby to institute said photochemical reaction;
    meansuring the total heat generated by said first chemiluminescent reaction and said photochemical reaction;
    measuring the heat generated by a second chemiluminescent reaction carried out with similar amounts of said predetermined participating substances;
    and subtracting the latter measurement from the former measurement, thereby to obtain the heat generated only by said photochemical reaction.

4. In a calorimetric method for quantitatively investigating the heat producing characteristics of photochemical reactions,
the improvement of restraining the substances involved in said photochemical reaction so as to form said substances into an annulus
and illuminating the inner boundary surface of said annulus with chemiluminescence thereby to start said photochemical reaction.

5. In a calorimeter for investigating the thermal characteristics of photochemical reactions, the combination of
a heat sink having a hollow, light-tight core;
a reaction vessel disposed within said core for accommodating substances which enter into a photochemical reaction when illuminated;
a thermopile having the hot junctions thereof in thermal contact with said reaction vessel and the cold junctions thereof in thermal contact with said heat sink;
and a light source adapted to illuminate said reaction vessel whereby the substances accommodated therein enter into a photochemical reaction with the heat evolved therefrom being measured by said thermopile.

6. In an arrangement as defined in claim 5 wherein said light source comprises a chemiluminescent reaction involving known amounts of participating substances.

7. In an arrangement as defined in claim 6 wherein means are provided so that
said participating substances are physically isolated from each other when said reaction vessel is in a first attitude
and come in contact with each other when said reaction vessel is displaced from the aforementioned attitude.

8. In a calorimeter for investigating the thermal response of photochemical reactions, the combination of
a heat sink having a hollow, light-tight core;
first and second vessels disposed within said core;
a first thermopile having the hot junctions thereof in thermal contact with said first vessel and the cold junctions thereof in thermal contact with said heat sink;
a second thermopile having the hot junctions thereof in thermal contact with said second vessel and the cold junctions thereof in thermal contact with said heat sink;
means for connecting said thermopiles in electrical series opposition;
a photochemical reaction accommodated within said first and second vessels;
means for producing chemiluminescence in said first and second vessels, said vessels being constructed such that the photochemical reaction in said first vessel is illuminated by said chemiluminescence and the photochemical reaction in said second vessel is unilluminated by said chemiluminescence, whereby the output voltage of said thermopiles indicates the amount of heat generated only by the photochemical reaction in said first vessel.

9. Apparatus for investigating the thermal characteristics of a photochemical reaction comprising
a calorimeter,
said calorimeter including a heat sink having a hollow, light-tight core, a heat conducting sleeve disposed therein and a thermopile having one series of thermojunctions in thermal contact with the outer surface of said sleeve and a complementary series of thermojunctions in thermal contact with the bore of said heat sink;
a reaction vessel deposited within said sleeve for accommodating said photochemical reaction;
and a chemical light source positioned within said reaction vessel for activating said photochemical reaction.

10. In a method for investigating the thermal response of a photochemical reaction, the steps of
accommodating said photochemical reactants in a vessel which forms said photochemical reactants into an annulus;
placing first and second substances within the core of said annulus in a spaced relationship;
said first and second substances when mixed coacting in a chemical reaction to produce chemiluminescence;
mixing said first and second substances;
and measuring by thermopile means the heat evolved from said photochemical reaction as a consequence of its illumination by said chemiluminescence.

11. For use in a calorimeter for thermally investigating photochemical reactions,
a reaction vessel,
said reaction vessel having an outer wall, an inner wall and an intermediate wall,
said intermediate wall being of a material that is transluscent to light;
and a light-reflecting substance applied to said inner wall whereby the light produced in the space between said intermediate wall by a chemical reaction taking place therein is reflected into the space between said outer wall and said intermediate wall.

12. A reaction vessel for use in a calorimetry comprising,
first, second and third tubular elements, said tubular elements being concentrically positioned with said first tubular element within said second tubular element and said second tubular element within said third;
means for closing off the ends of said tubular elements whereby inner and outer annular shaped compartments are formed;
said second tubular element being made of translucent material;
and means for making said first tubular element light reflective.

13. In an arrangement as defined in claim 12,
a pair of dimpled recesses formed in said first tubular element
and means cooperating with said third and second tubular elements for permitting material to be introduced into said dimpled recesses for temporary storage.

14. For use in a calorimeter for investiagting the thermal response of a photochemical reaction,
a reaction vessel, said reaction vessel having inner and outer annular compartments for accommodating a chemiluminescent reaction and a photochemical reaction, respectively;
and means for directing substantially all of the light produced in said inner compartment by said chemiluminescent reaction into said outer compartment.

15. In an arrangement as defined in claim 14 wherein
said inner compartment includes first and second storage means for maintaining substances accommodated therein physically isolated when said reaction vessel is in a first attitude,
said substances being brought into mutual contact whenever said vessel is displaced from said first attitude.

16. In a calorimeter for investigating the thermal response of photochemical reactions, the combination of
a heat sink having a hollow, light-tight core;
a reaction vessel disposed within said core for accommodating materials which enter into a photochemical reaction when illuminated with light energy;
a thermopile having its hot junctions in thermal contact with said reaction vessel and its cold junctions in thermal contact with said heat sink; and
means positioned within said core for illuminating said reaction vessel with light energy whereby said materials enter into a photochemical reaction and said thermopile measures the heat evolved therefrom.

17. In a calorimeter for investigating the thermal response of photochemical reactions, the combination of
a heat sink having a hollow, light-tight core;
a reaction vessel disposed within said core for accommodating materials which enter into a photochemical reaction when illuminated with light energy;
a thermopile having its hot junctions in thermal contact with said reaction vessel and its cold junctions in thermal contact with said heat sink; and
means responsive to the displacement of said reaction vessel from a first attitute to a second attitude for illuminating said reaction vessel with light energy whereby said materials enter into a photochemical reaction, the heat of which is measured by said thermopile.

18. In an arrangement as defined in claim 17 wherein said last-mentioned means includes substances which enter into a chemiluminescent reaction when brought together.

19. In a method for determining the thermal response of a photochemical reaction, the steps of
measuring with a first thermopile the amount of heat produced by a first chemiluminescent reaction involving known amounts of participating substances and
simultaneously measuring with a second thermopile which is connected in electrical series opposition with said first thermopile the total amount of heat produced by a second chemiluminescent reaction involving the same known amounts of participating substances and a photochemical reaction which is instituted by the light energy radiated from said second chemiluminescent reaction whereby the output voltage developed by the series first and second thermopiles represents the net amount of heat produced by said photochemical reaction.

References Cited by the Examiner

Kimble, Laboratory Glassware Catalog, SP-75, pages 248-249. November 1961.

RICHARD C. QUEISSER, *Primary Examiner.*

J. C. GOLDSTEIN, *Assistant Examiner.*